(12) United States Patent
ThymeGobbel et al.

(10) Patent No.: US 12,511,331 B2
(45) Date of Patent: Dec. 30, 2025

(54) SHARED CONTEXT MANAGER FOR COHABITATING AGENTS

(71) Applicant: D&M Holdings, Inc., Kanagawa (JP)

(72) Inventors: Ann ThymeGobbel, Brisbane, CA (US); Robert M. Kilgore, Brooklyn, NY (US); David James, Waterbeach (GB)

(73) Assignee: D&M HOLDINGS, INC., Kanagawa (JP)

( * ) Notice: Subject to any disclaimer, the term of this patent is extended or adjusted under 35 U.S.C. 154(b) by 0 days.

(21) Appl. No.: 16/981,354

(22) PCT Filed: Mar. 19, 2019

(86) PCT No.: PCT/US2019/022856
§ 371 (c)(1),
(2) Date: Sep. 16, 2020

(87) PCT Pub. No.: WO2019/194965
PCT Pub. Date: Oct. 10, 2019

(65) Prior Publication Data
US 2021/0049215 A1 Feb. 18, 2021

Related U.S. Application Data

(60) Provisional application No. 62/653,783, filed on Apr. 6, 2018.

(51) Int. Cl.
*G10L 15/22* (2006.01)
*G06F 9/451* (2018.01)
(Continued)

(52) U.S. Cl.
CPC ........ *G06F 16/90332* (2019.01); *G06F 9/453* (2018.02); *G06F 40/35* (2020.01);
(Continued)

(58) Field of Classification Search
CPC .......................... G10L 15/22; G10L 15/1815
See application file for complete search history.

(56) References Cited

U.S. PATENT DOCUMENTS 7,036,128 B1    4/2006  Julia et al.
9,990,591 B2    6/2018  Gelfenbeyn et al.
(Continued)

OTHER PUBLICATIONS

International Search Report for PCT/US19/22856 dated Jun. 13, 2019.
(Continued)

*Primary Examiner* — Feng-Tzer Tzeng
(74) *Attorney, Agent, or Firm* — Nieves IP Law Group, LLC; Peter A. Nieves (57) ABSTRACT

A user controls a computer application with a first multi-modal agent and a second multi modal agent. A shared context manager is configured to receive from the first agent a first intent having a first data field, and to receive from the second agent a second intent having a second data field. The shared context manager forms a modified second intent based upon the first data field, and provides the modified second intent to the second agent. An intent stack is configured to receive the first intent and the modified second intent from the shared context manager and to store the first intent and the modified second intent.

15 Claims, 9 Drawing Sheets

(51) Int. Cl.
*G06F 16/9032* (2019.01)
*G06F 40/35* (2020.01)
*G10L 15/32* (2013.01)
*G10L 15/18* (2013.01)

(52) U.S. Cl.
CPC .............. *G10L 15/22* (2013.01); *G10L 15/32* (2013.01); *G10L 15/1815* (2013.01)

(56) References Cited

U.S. PATENT DOCUMENTS

| | | | | |
|---|---|---|---|---|
| 2009/0307189 | A1* | 12/2009 | Bobbitt | G06F 16/00 |
| 2010/0100380 | A1* | 4/2010 | Tur | G10L 13/08 |
| | | | | 704/244 |
| 2013/0211710 | A1* | 8/2013 | Kennewick | G10L 15/08 |
| | | | | 704/275 |
| 2014/0222422 | A1* | 8/2014 | Sarikaya | G06F 16/3338 |
| | | | | 704/231 |
| 2014/0257792 | A1* | 9/2014 | Gandrabur | G10L 15/1815 |
| | | | | 704/9 |
| 2017/0349184 | A1 | 12/2017 | Tzirkel-Hancock et al. | |

OTHER PUBLICATIONS

Extended European Search Report for EP19781918 dated Nov. 30, 2021.

* cited by examiner

SHARED CONTEXT MANAGER FOR COHABITATING AGENTS

CROSS-REFERENCE TO RELATED APPLICATIONS

This application is a national phase entry of PCT/US19/22856, filed Mar. 19, 2019 and entitled Shared Context Manager for Cohabitating Agents, which claims the benefit of U.S. Provisional Patent Application Ser. No. 62/653,783, filed Apr. 6, 2018, entitled "Shared Context Manager for Cohabitating Agents," both of which are incorporated by reference herein in its entirety.

FIELD OF THE INVENTION

The present invention relates to control systems and more particularly, is related to voice control of consumer devices.

BACKGROUND OF THE INVENTION

A computing device, for example, a consumer electronic device, may include a voice command interface, often presented as a "digital assistant" that receives uttered voice phrases and converts the phrases into actionable commands for applications in communication with the device. For example, the electronic device may have a microphone that is always on, and the digital assistant, referred to herein as an "agent," may be dormant until the microphone detects an audio trigger, such as a wakeword, that keys the agent that the uttered voice phrase is intended to be directed to the agent.

The computing device may host more than one agent, where each agent responds to specific tasks and may not be aware of tasks performed by other agents. Therefore, a command directed to a first agent may include information that may be useful to a second agent, yet the second agent is not privy to this information. This may be confusing to the user of the system, who may not remember which of his voice commands were directed to which agent. Therefore, there is a need in the industry to address one or more of these issues.

SUMMARY OF THE INVENTION

Embodiments of the present invention provide a shared context manager for cohabitating agents. Briefly described, the present invention is directed to a method, system, or device where a user controls a computer application with a first multi-modal agent and a second multi modal agent. A shared context manager is configured to receive from the first agent a first intent having a first data field, and to receive from the second agent a second intent having a second data field. The shared context manager forms a modified second intent based upon the first data field, and provides the modified second intent to the second agent. An intent stack is configured to receive the first intent and the modified second intent from the shared context manager and to store the first intent and the modified second intent.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

The following definitions are useful for interpreting terms applied to features of the embodiments disclosed herein, and are meant only to define elements within the disclosure.

As used within this disclosure, a "multi-modal agent," or "agent," refers to a module or process hosted by a device that responds to one or more modes of receiving a command, for example, a voice command, a text command, a touch command (tap, swipe, et cetera), among others, and formulates a response action, for example, to control an application. While the embodiments refer to a multi-modal agent, other embodiments may be applicable to single mode agents, for example, voice or text only. Generally, a multi-modal agent may keep track of the mode that received information came to the agent, for example, associating a command source with the receiving mode. Optionally, the embodiments may prioritize input modes, so, for example, conflicting commands may be resolved by executing the command of the higher priority mode (e.g., text command overrides a voice command), where the mode priority may be a user configurable parameter.

As used within this disclosure, an "intent" refers to a presumed desired action or response to a command by a user, for example, as interpreted by an agent. An agent may be configured to parse the command to determine the intent, and the intent may be represented by a data structure indicating results of the parsing, a presumed action, and a confidence score indicating a probability assigned by the agent indicating whether the agent is confident that the derived intent accurately represents the intent of the user. The intent may also indicate the source of the command.

As used within this disclosure, a "modified intent" refers to a data structure that includes information from a received intent that has been altered. For example, the modified intent may have a different formatting than the received intent (for example, different fields, or differently named fields), and/or may include one or more additional and/or different data fields not present in the received intent.

As used within this disclosure, "anaphoric" and/or "anaphorically" indicates a word or phrase in a text or utterance that refers to other ideas in the text or another utterance for its meaning, for example, but not limited to "this", "that", "those", "them." Similarly, an anaphoric reference may indicate a source or subject, for example, "my," "his," "her," among others, or may indicate other aspects of the device/system receiving the command, or an application being controlled by the device/system. Anaphoric references may also be temporally resolved, for example, "now" may be interpreted as an event concurrent with the received utterance, such as the current song. Anaphoric references may further indicate something in the wording of the user's request, or may indicate something in the wording of the system's audio response.

The process of identifying a reference indicated by an anaphoric word/phrase is referred to herein as "resolving" the anaphoric word/phrase. A text or utterance where an anaphoric word/phrase has been replaced by its reference may be referred to herein as having been "resolved."

As used within this disclosure, a "host" of an agent refers to a device that provides a user of the device access to the agent, where the processor or possessors running the agent may be either local to the device or remote from the device. For example, the device may be in communication with a remote server that provides the services of the agent to the device via an agent application programming interface (API). Similarly, the agent may communicate with an end application via an application API.

As used within this disclosure, a "cohabitating agent" refers to one of two or more agents hosted by a device. For example, a first cohabitating agent may be resident in the device, and a second cohabitating agent may reside externally to the device and remotely accessed, for example by an external server ("cloud server").

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention provide a system whereby two or more cohabiting agents may access metadata gathered through an interaction history of a user such that a second agent is able to use data requested or provided through previous interactions with a first agent, using a shared "intent stack" or data store. Requests to either agent that yield resulting data may be processed by a 'Shared Context Manager' (SCM) storing any items derived from previously parsed request/intent in a shared "info space" such that either agent can make future references to the data anaphorically.

Figure 1:
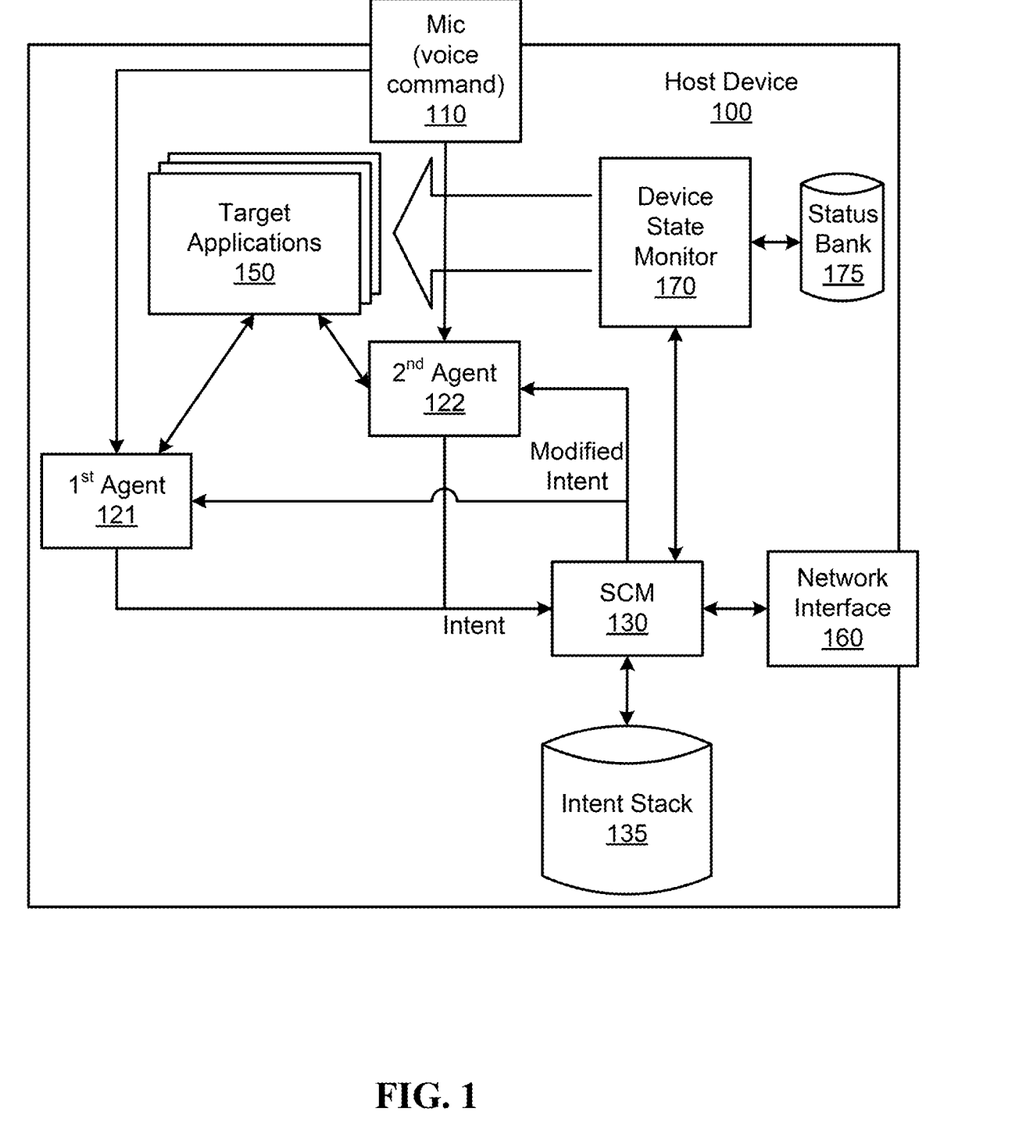
FIG. 1 is a schematic drawing of a first exemplary embodiment of a device with a shared context manager.

FIG. 1 is a schematic drawing of a first embodiment of a device 100 with a shared context manager (SCM) 130. For example, the device 100 may be a smart speaker, a smart phone, or tablet computer, among other possibilities. The device 100 has a first agent 121 and a second agent 122, each configured to respond to commands, for example, voice commands. The first agent 121 and/or the second agent 122 may be, for example, processes (applications) executed by a processor of the host device 100 or by a processor of a remote device in communication with the host device. One or more target applications 150 may be resident in the host device 100, may be external to the host device, for example, a cloud based application, or may be a combination of local and remote applications. Examples of applications may include a local music player, a cloud based streaming music service, an alarm clock, an application controlling an internet of things (IoT) device such as a light switch or a thermostat, among others. The first agent 121 and the second agent 122 may have access to different resources or information, and may not both access the same target applications 150, or may not have the same access to a common target application. Therefore, identical commands to different agents 121, 122 may not yield the same result. The SCM 130 may communicate with the first agent 121 via a first agent API. Similarly, the SCM 130 may communicate with the second agent 122 via a second agent API. Alternatively, or in addition, the SCM may have a native SCM API to communicate with the first agent 121 and/or the second agent 122.

The target applications 150 may receive commands from the first agent 121 and/or the second agent 122 indicating actions to be executed by the target applications 150. Examples of a target application include an audio file player, a weather application, a news headline application, a home dashboard application, among others. Each of the first agent 121 and the second agent 122 may be configured to control one or more of the target applications 150, and one or more of the target applications 150 may be controlled by both the first agent 121 and the second agent 122.

A device state monitor 170 may monitor and/or maintain status information for one or more target applications 140, as well as other information regarding the status of the device 100. For example, the device state monitor 170 may maintain a status bank 175, such as a database, configured to store the present status of one or more target applications 150. For example, the status of an audio player application may have status data indicating information identifying an audio track presently being rendered, or a thermometer application may have status data indicating the present temperature. The target applications 150 may apprise the device state monitor 170 when one or more status items is updated, or the device state monitor 170 may periodically poll one or more target applications to keep the status bank up to date. In alternative embodiments, the device state monitor 170 may operate without a status bank 175, and directly query the target applications 150 as needed, for example, when the device state monitor is queried about the status of a target application 150. The device state monitor 170 may operate using a combination of a status bank 175 and direct querying of target applications 150.

The device 100 includes a microphone 110 that may receive a voice command and route it to the first agent 121 and the second agent 122. In alternative embodiments, the device 100 may not have an internal microphone, but may be in communication with an external device that has a microphone. The voice command may include a wakeword identifying whether the first agent 121 or the second agent 122 is intended to receive the voice command. The wakeword may be the name of the agent 121, 122. For example, the wakeword, "Agent A" may indicate that the voice command is intended for the first agent 121, and the wakeword, "Agent B" may indicate that the voice command is intended for the second agent 122.

For example, a voice command "Agent A, turn on the kitchen light" may be routed to the first agent 121. The first agent 121 may convert the voice command from speech to text, for example using an automatic speech recognition (ASR) process specific to the first agent 121, or using an ASR process provided by the host device 100. The first agent 121 may parse the converted text into an intent, for example, by populating one or more fields of a first intent data structure with information from the parsed text. Based on this intent, the first agent 121 may identify a target application 150 for the command, and format a command for the target application 150 based on the parsed voice command, and forward the command to the target application 150. The first agent 121 may record this command in second intent data structure. The first and/or second intent may be provided to a shared content manager (SCM) 130. For example, the first agent 121 may send the first and/or second intent to the SCM 130, or may make first and/or second intent available to the SCM 130 upon request.

The first and/or second intent may include data fields provided to the agent 121, 122 by the target application 150. For example, the target application 150 may provide, for example by autonomous alerts or polling, information regarding the state of the target application 150. The SCM 130 receives the intent and may attempt to augment the intent, for example, by extrapolating information from the intent and/or by augmenting the fields in the intent. For example, if the SCM 130 receives an intent that includes a song title, the SCM 130 may seek auxiliary information related to that song title, for example, by querying a web based application via a network interface 160. For example, the query may result in a list of popular recording corresponding to the song title, and may augment the intent data structure with additional fields (metadata), for example, a recording artist, a composer, an album containing the song having the song title, among others.

The SCM 130 may create a modified intent data structure, for example, including the received intent as well as the additional fields, and store them in an intent stack 135. It should be noted that the SCM 130 may store the intent in the intent stack 135 whether or not the intent is augmented. Further, the SCM 130 may perform a format conversion on the received intent data structure before storing the intent data structure in the intent stack. For example, the SCM may convert the received intent from a format native to the first agent 121 or the second agent 122 into a format native to the SCM 130. Likewise, when data is retrieved from the intent stack, the SCM may reformat the data based on the intended recipient, for example, to a format recognized by the first agent 121 or the second agent 122.

Figure 2A:
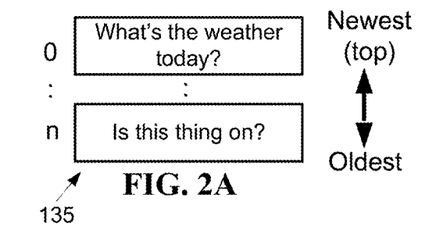
FIG. 2A is a schematic drawing if the intent stack of FIG. 1 in a first state.

The intent stack 135 may function like a computer data stack familiar to persons having ordinary skill in the art, where a new entry is added to (pushed onto) the top of the intent stack 135, and all previous stack entries are pushed down the intent stack 135, as shown by FIGS. 2A-2E. As subsequent entries are added, older entries are pushed down the intent stack 135. Each stack entry may contain additional information, for example a timestamp and the identity of the agent 121, 122 that provided the intent data structure, and other information. As shown by FIG. 2A, at an arbitrary point in time, the intent stack 135 may include n+1 entries, with the most recent entry (0) corresponding to an utterance "What's the weather today," and the nth entry corresponding to an utterance "Is this thing on?" The entries between 0 and n have been omitted here for clarity.

It should be noted that while FIGS. 2A-2E indicate an entry in the intent stack 135 by the utterance, this is merely a visual aid to indicate the underlying intent data structure being stored in the intent stack 135. Details regarding the intent data structure are provided in more detail below. While FIGS. 2A-2E illustrate voice commands, the stack entries may be multi-modal (accepting multiple sources of input).

Figure 2B:
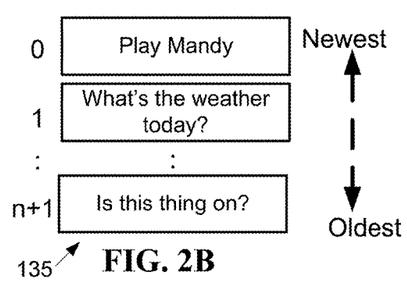
FIG. 2B is a schematic drawing if the intent stack of FIG. 1 in a second state.
Figure 2C:
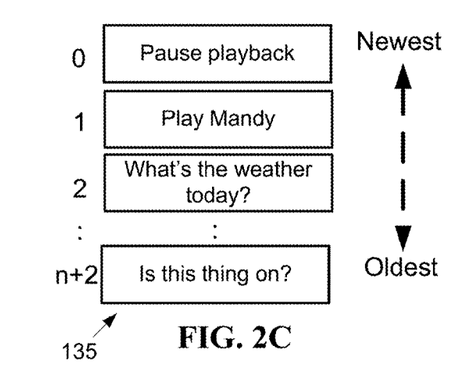
FIG. 2C is a schematic drawing if the intent stack of FIG. 1 in a third state.
Figure 2D:
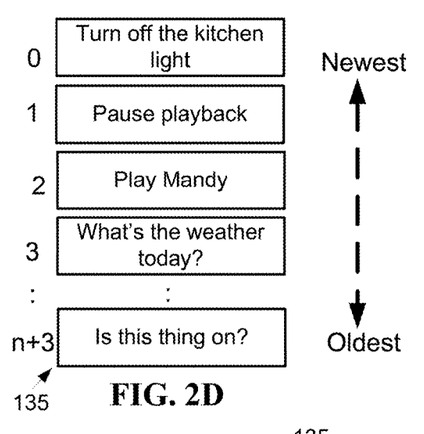
FIG. 2D is a schematic drawing if the intent stack of FIG. 1 in a fourth state.

As shown by FIG. 2B, a new entry based on the utterance "Play Mandy" is added to (pushed onto) the intent stack 135 by the SCM 130. An intent created from the utterance may have been provided by the first agent 121 or the second agent 122. As the "Play Mandy" utterance is added to the intent stack 135, all other previous entries are pushed down the stack, which has now expanded to accommodate n+2 entries, with the "Play Mandy" entry at the top of the stack (entry 0, indicating the newest entry), with all previous entries pushed down one entry, for example, "What's the weather today?" pushed down from entry 0 to entry 1, and the oldest entry, "Is this thing on?" pushed down to entry n+1.

FIGS. 2C-2F illustrate subsequent additions to the stack of entries associated with the phrases "Pause playback," "Turn off the kitchen light," "Resume playback," and "what album is this song from?" respectively. The entries may have originated from either the first agent 121 or the second agent 122.

The SCM 130 may supplement the functionality of the first agent 121 and/or the second agent 122 in several ways. For example, the SCM 130 may augment the intent data structure receive from the first agent 121 or the second agent 122 with one or more data fields, for example, by using the information received in the intent data structure to query external information sources. This is described in more detail below.

Figure 2E:
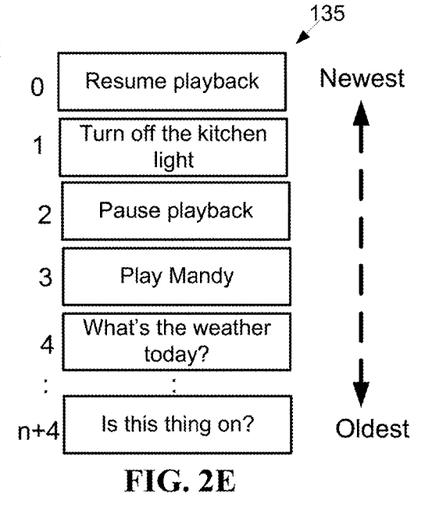
FIG. 2E is a schematic drawing if the intent stack of FIG. 1 in a fifth state.
Figure 2F:
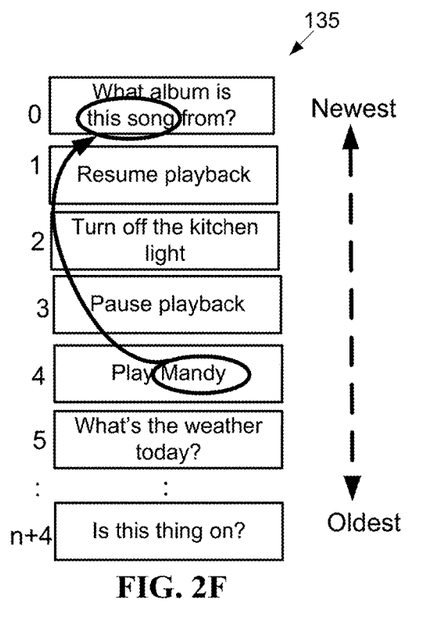

The SCM 130 may infer a context for a received intent based on a prior entry in the intent stack 135. For example, in FIG. 2F, the utterance "What album is this song from?" in the newest entry (entry 0) may seek context to determine which song "this song" is referring to. This is an example of the SCM 130 using the intent stack 135 to address an anaphoric portion of an intent. The SCM 130 may recognize that <this song> is an anaphoric reference, and proceed to walk down the intent stack 135 to try to resolve the anaphoric reference. Here, entry 1 "resume playback" does not resolve the anaphoric reference. Similarly, entry 2 "Turn off the kitchen light," and entry 3 "Pause playback" do not resolve the anaphoric reference. However, entry 4, "Play Mandy," includes the song title "Mandy," and may then be a candidate to resolve the anaphoric reference <this song> in entry 0. Therefore, entry 0 "What album is <this song> from" may be interpreted by the SCM as "what album is <Mandy> from?" The answer to the query "What album is <Mandy> from?" may be present in the modified intent stored in entry 4 of the intent stack 135, for example if the SCM 130 previously queried an external source for this information. Alternatively, the SCM 130 may initiate a new query to an external source, for example, via the network interface 160, to a source that may provide supplemental information regarding one or more fields in the intent data structure.

The intent stack 135 may not be the only source for resolution of anaphoric intents, as the intent stack may not include information not directly included in the intent. For example, if the SCM 130 receives a intent from an agent 121, 122 indicating a user has requested a music player (target application 150) to play to an album, a subsequent intent requesting the name of the song being played may not be resolved using the intent stack, as the track names for the requested album may not be contained in the intent stack 135. Although the SCM 130 could be configured to respond to a request to play an album by the SCM 130 requesting and augmenting an entry in the intent stack 135 with the names of all the tracks on the album, this approach may not be applicable to other sources of music. For example a request to 'play jazz from Spotify,' where "jazz" is a music genre, and "Spotify" indicates a music streaming service target application 150 may result in the Spotify target application continuously playing tracks from the jazz genre. In this case, the anaphoric intent of a subsequent request for a track name may be resolved using metadata and audio-data from the selected target application (the streaming music service in this example) in a 'just-in-time' fashion so that playback of track N+1 is rendered soon after track N concludes. The first embodiment may add an entry to the intent stack 135 based on an event reported to the agent 121, 122 by the target application 150, for example, the SCM 130 adding a new track name to the intent stack 135 when the target application 150 (the streaming service in this example) notifies the agent 121, 122 that a new track is playing, and the agent 121, 122 forwards this information t0 the SCM 130 in the form of an intent.

The SCM 130 may access a device state monitor 170 (FIG. 1) to resolve the anaphoric reference. For example, while FIG. 2F shows that entry 4 of the intent stack 135 was the most recent entry in the intent stack 135 indicating a possible resolution of the anaphoric reference <this song>, a music player application that played Mandy as the result of the "Play Mandy" command may have advanced to play another song since the entry corresponding to "Play Mandy" was placed on the intent stack 135. In this instance, "Mandy" is no longer the currently playing song, and therefore is likely not the correct response to the query "What album is <this song> from?" Here, the SCM 130 may access the device state monitor 170 to determine the name of the song currently being rendered by a music player application in the host device 100. The SCM 130 may then use the name of the presently playing song to query an external resource (via the network interface 160) to resolve the question "What album is <this song> from?"

The SCM 130 may use other mechanisms to determine if an entry in the intent stack 135 has become "stale," meaning the entry is no longer relevant to the current state of target applications 150 and/or another aspect of the host device 100. For example, the SCM 130 may associate a timestamp with each entry in the intent stack 135 to help determine the present relevance of an entry in the intent stack 135. Similarly, the SCM 130 may limit the depth in the intent stack 135 it may traverse to resolve an anaphoric reference, or may lower the confidence in entries in the intent stack 135 past a certain depth indicated by a specified depth threshold and/or lower the confidence in entries in the intent stack 135 having a timestamp past a specified duration (e.g., an expiration time).

The SCM 130 may provide context for an entry originated by the first agent 121 based on a prior stack entry originated from the second agent 122. Likewise, the SCM 130 may provide context for an entry originated by the second agent 122 based on a prior stack entry originated from the first agent 121. For example, assume a user listening to a symphony that is being rendered by a music application 150, and the user asks the first agent 121 "Play the first movement of this symphony with the same conductor". An exemplary intent data structure may be an auto-generated JSON structure that may look like this:

```
{
    "domain": "music",
    "intent": "play.cl.symphAna.moveNum.condAna",
    "item": "symphony": {"name": "null", "spec": "ana"},
        "conductor": {"name": "null", "spec": "ana"},
        "movement": {"number": "1", "spec": "number"}},
    "outcome": "success",
    "utterance": "play the first movement of this symphony with the same conductor"
}
```

In the intent data structure, the SCM 130 may encode the source of the information. Here, the intent label indicates that the user only specified the number of the movement, not the name of the composer or symphony, only that they want to hear the same conductor. By using information from the intent stack and backend data, for example, from the MusicBrainz web site or another internet resource, the SCM 130 may obtain sufficient detail to provide the user with what he asked for. The SCM 130 makes queries to update the intent with the missing information and might thereafter look more like this:

```
{
    "domain": "music",
    "intent": "play.cl.symphAna.moveNum.condAna",
    "item": {"composer": {"name": "Ludwig van beethoven", "spec": "db"},
        "conductor": {"name": "josef krips", "spec": "db"},
        "symphony": {"name": "Symphony No. 6 in F Major, Op. 68, Pastoral'", "spec": "db"},
        "movement": {"number": "1", "spec": "number"},
        "orchestra": {"name": "london symphony orchestra", "spec": "db"},
        "year": "2013"}},
    "outcome": "success",
    "mbid": "4a896518-c15e-4a25-8652-7e6adf74879e",
    "utterance": "play the first movement of this symphony with the same conductor"
}
```

If the user next asks what orchestra is playing or the name of the symphony etc., the SCM 130 would not need to look it up again in some external data source since the information being sought is now available in the intent structure. Similarly the user may ask the second agent 122 to play the whole symphony and the reference info would be available in the intent stack 135.

Figure 3:
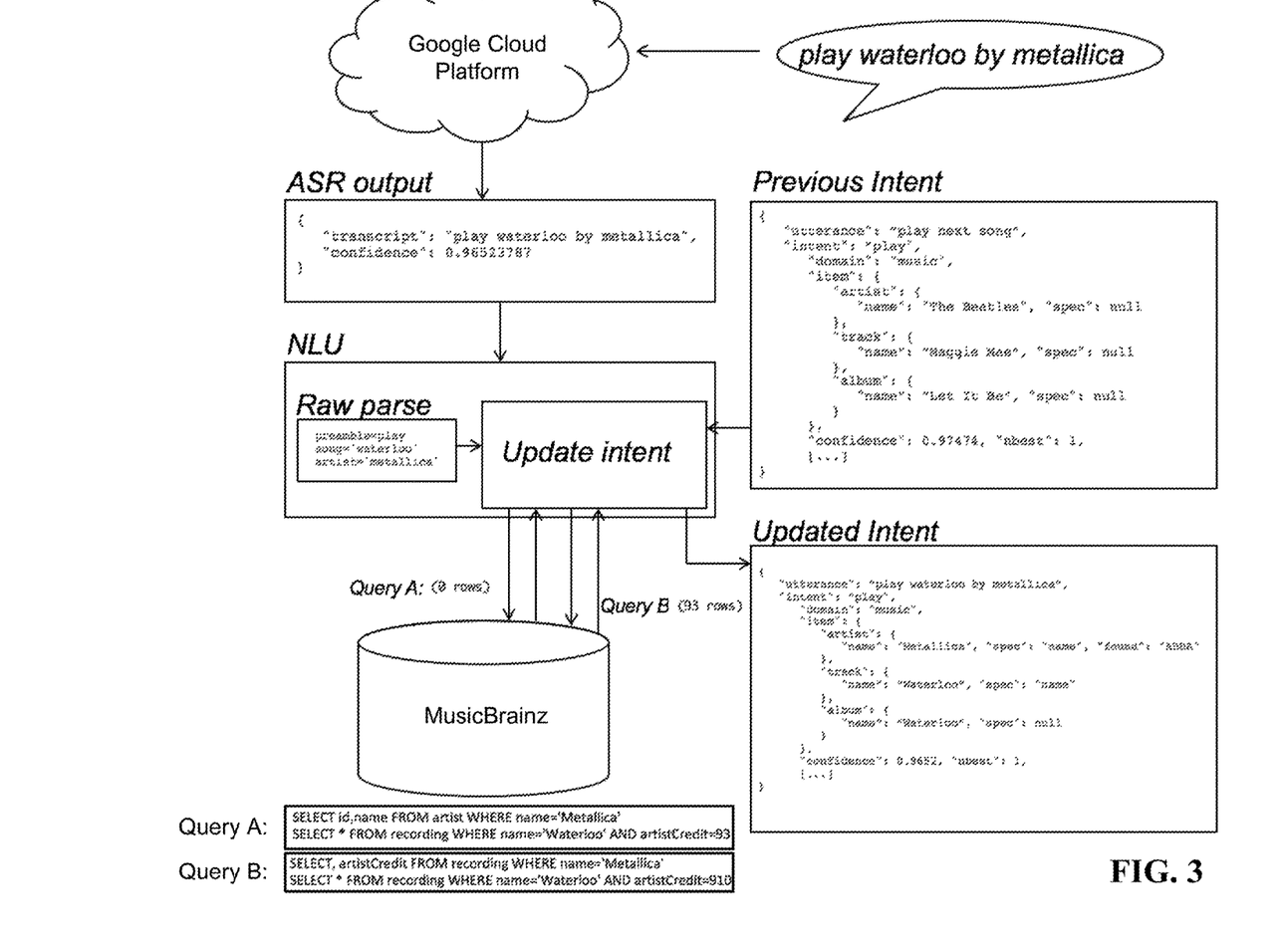
FIG. 3 is a schematic diagram illustrating a process for responding to an utterance.
Figure 4:
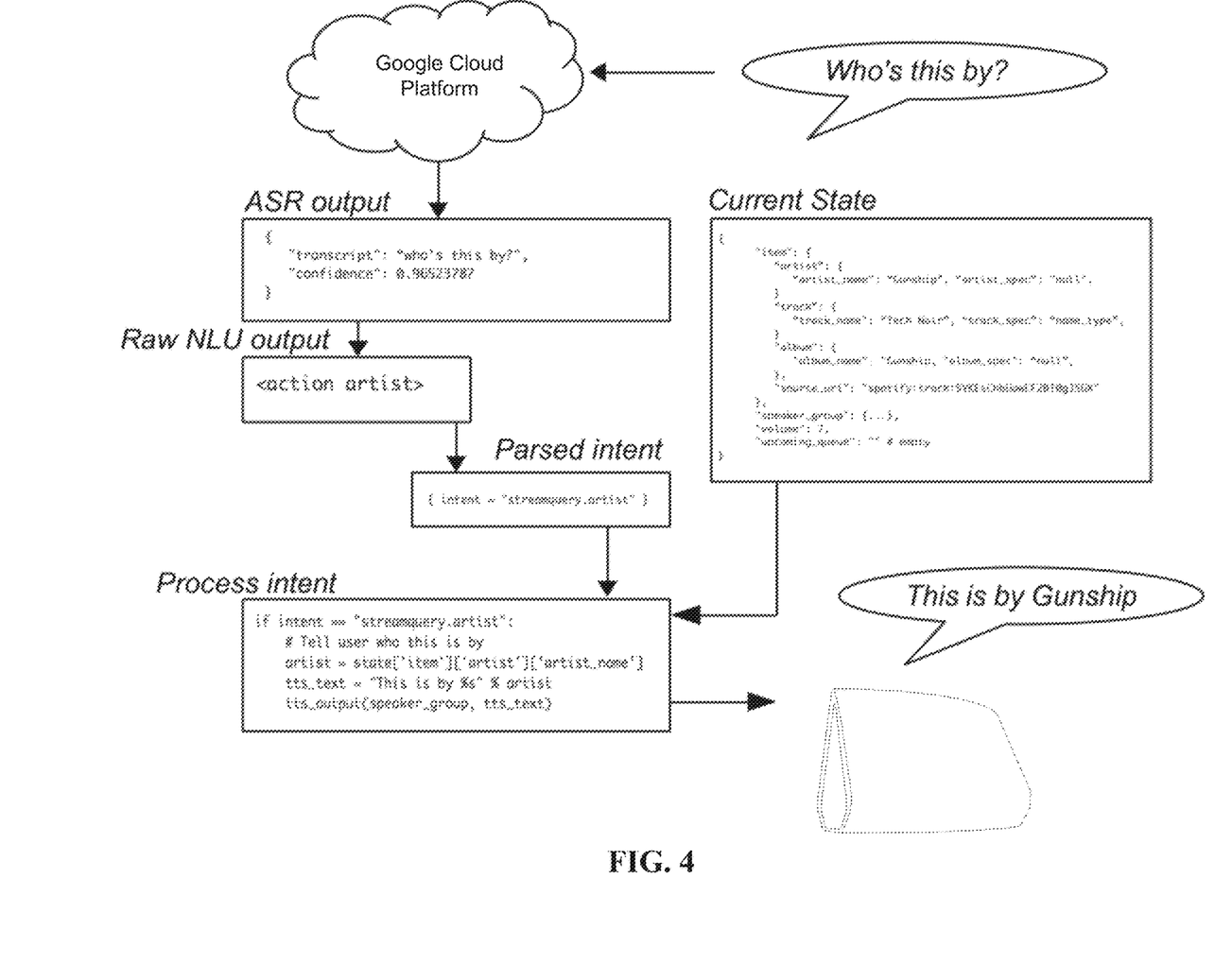
FIG. 4 is a schematic diagram illustrating a process for responding to an utterance with anaphoric content.

FIG. 3 illustrates a scenario that might occur if the user utters "Play Waterloo by Metallica". Instead of just telling the user "never heard of that" the SCM 130 can utilize external sources of information, for example, the MusicBrainz web site or another database to find a top match and perhaps respond by a voice prompt of "Can't find Waterloo by that artist, but here it is by ABBA." The SCM 130 may track both what the user asked for and the response that was provided as a result, both of which may be relevant to context and more complex conversations. FIG. 4 shows how anaphora might look schematically.

For example, assume a user utters "Play Enter Sandman from Spotify in the kitchen." An exemplary intent data structure may be an auto-generated JSON structure that may look like this:

```
{
    "domain": "music",
    "intent": "play.track.source.device",
    "artist": null,
    "track": "enter sandman",
    "album": "metallica",
    "source": "Spotify",
    "device": "kitchen",
    "date": null,
    "genre": null,
    "label": null,
}
```

After a query by the SCM 130 to one or more external sources, the missing information gets filled in as:

```
{
    "domain": "music",
    "intent": "play.track.source.device",
    "artist": "metallica",
    "track": "enter sandman",
    "album": null,
    "source": "Spotify",
    "device": "kitchen",
    "date": "1991",
    "genre": "heavy metal",
    "label": "Elektra",
}
```

The SCM 130 may be configured to keep track of, update, and observe the following to make sure that all Agents 121, 122 can correctly interpret the context of the conversation:
1. The text and intent of the uttered request (what was the user asking for),
2. a confidence score for #1,
3. the outcome of the request (was it successful or not, multiple attempts needed),
4. any data resulting from the request,
5. additional metadata provided by the SCM based on supplemental info (for example, from a web site such as MusicBrainz, Wikipedia, et cetera),
6. a current state of the system (for example, what is playing where, what services are enabled, et cetera), and
7. a current state of the world (for example, the time of day, elapsed time since an event, et cetera).

Here, the actions taken by the SCM 130 with the intent stack 135 may be thought of as the capture and enhancement data as described above on a virtual whiteboard. Both the first agent 121 and the second agent 122 may be provided the relevant info on the intent stack 135 and their respective applications 150 can make the best decisions about interactions based on the current context. Both Agents 121 and 122 have access to everything the SCM 130 has amassed in the intent stack 135.

In some embodiments, the SCM may implement a contextual relevance which decays over time (#7 above). For example, in some instances only the Most Recently Used (MRU) n number of intents may be accessible for use in the current context. Attempting to make a request based on stale context may induce an Agent 121, 122 to respond with a clarification question to refresh the context.

From a software services point of view, the SCM 130 and the intent stack 135 of the first embodiment may be viewed as a kind of stenographer taking notes—keeping track of useful metadata relating to any request, filling in the blanks in provided context data (or metadata) to further populate a "halo of related information" relevant to the domain at hand. In the following example, the host device 100 is a smart speaker product that has two voice agents 121, 131 running concurrently and controlling a music playing application 150.

The first agent 121 fulfills a request for a song or playlist.

The application 150 receives some metadata related to requested song, artist, or album and provides it via the first agent 121 to the SCM 130.

The application 150 may provide the metadata to the user, for example, by displaying the metadata on a "now playing" screen the host device 100.

The SCM 130 may take the provided metadata and uses it to query for additional data including, but not limited to SONG TITLE, ARTIST NAME, ALBUM TITLE, RELEASE DATE, GENRE, SIMILAR ARTISTS. The SCM 130 may add this information to the intent stack by augmenting an existing entry, or by adding a new entry. The second agent 122 is then able to leverage the information provided by the SCM 130 to answer anaphoric questions or fulfill requests using the shared data. Examples of this may include:

User: "Agent A, play my yoga playlist on the patio"
User: "Agent B, who sings that song playing on the patio?"
User: "Agent A, play my Mozart playlist in the bedroom"
User: "Agent B, play NPR in the kitchen"
User: "Agent A, what's playing in the kitchen?" (only one thing playing)
Agent A: "You're listening to KQED"
User: "Agent A, play my Mozart playlist in the bedroom"
User: "Agent B, what's playing?"
Agent B: "You're listening to Die Zauberflöte by Mozart"
User: "Agent A, play my Mozart playlist in the bedroom"
User: "Agent B, play NPR in the kitchen"
User: "Agent A, what's playing?"
Agent A: "Where, in the bedroom or in the kitchen?"
User: "In the kitchen"
Agent A: "You're listening to KQED there"
User: "Agent A, who wrote the lyrics for . . . ?"
Agent A: "Sorry I don't know that"
User: "Agent B, do you know?
Agent B: " . . . was written by Leonard Cohen in 1984"
User: "Agent A, play more songs from that year"
Agent A: "Here's . . . "
User: "Agent A, play Hallelujah by Leonard Cohen"
Agent A: "playing . . . "
User: "Agent A, play the live version of this"
Agent A: "I can't find that."
User: "Agent B, can you find it?"
Agent B: "Here's . . . by Leonard Cohen"

Figure 6:
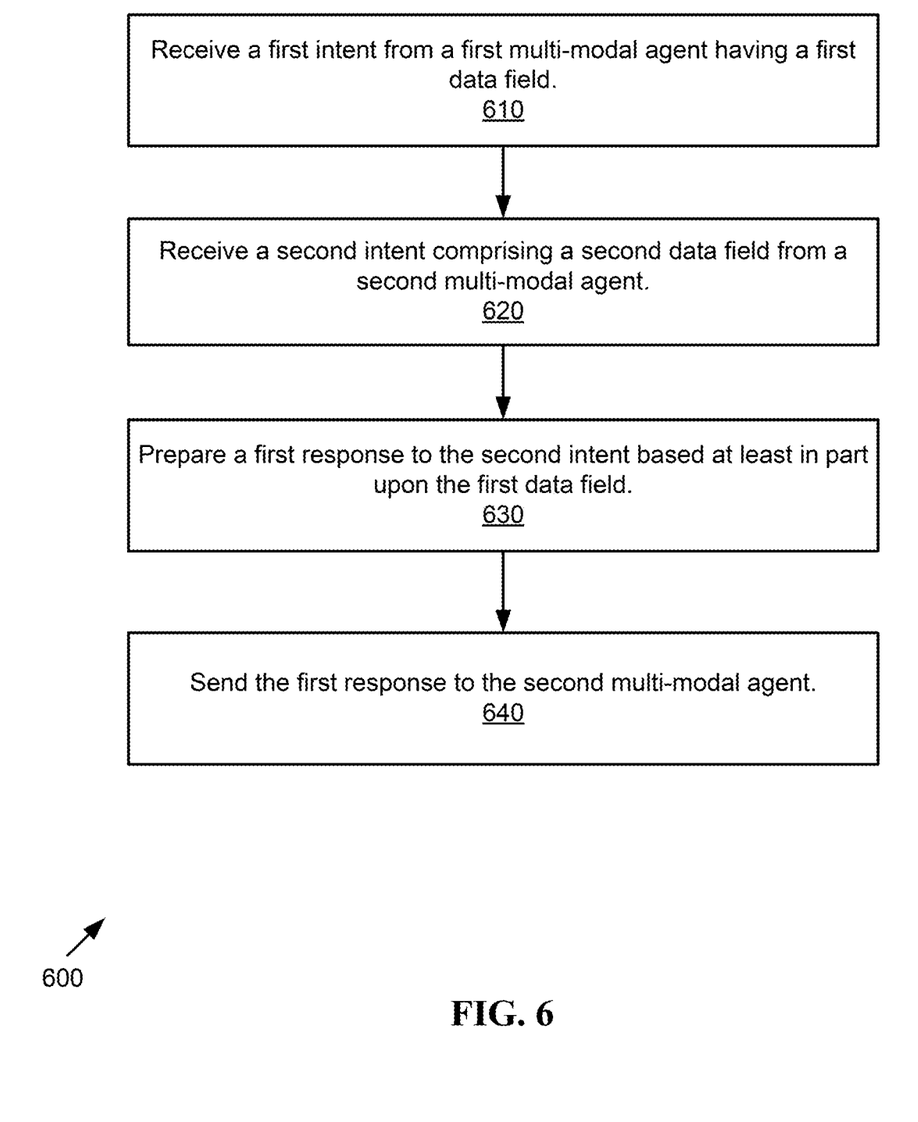
FIG. 6 is a flowchart of an exemplary method for operating a shared context manager.

FIG. 6 is a flowchart showing an exemplary embodiment of a method for a computer based context manager in communication with a first multi-modal agent and a second multi-modal agent configured to control an application. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A first intent is received from the first multi-modal agent 121 having a first data field, as shown by block 610. A second intent having a second data field from the second multi-modal agent 122, as shown by block 620. A first response to the second intent is prepared based at least in part upon the first data field, as shown by block 630. The first response is sent to the second multi-modal agent 122, as shown by block 640.

Figure 5:
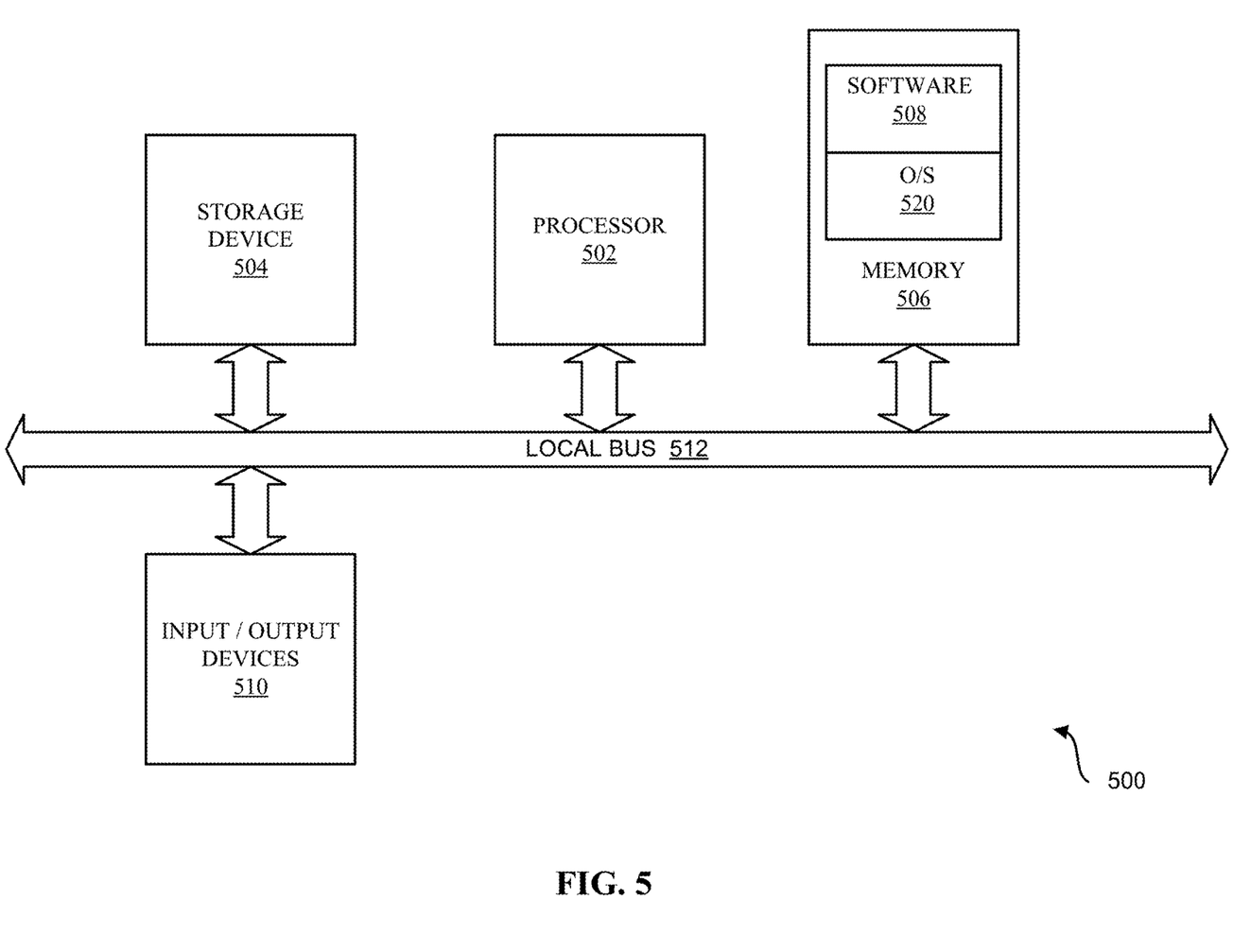
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
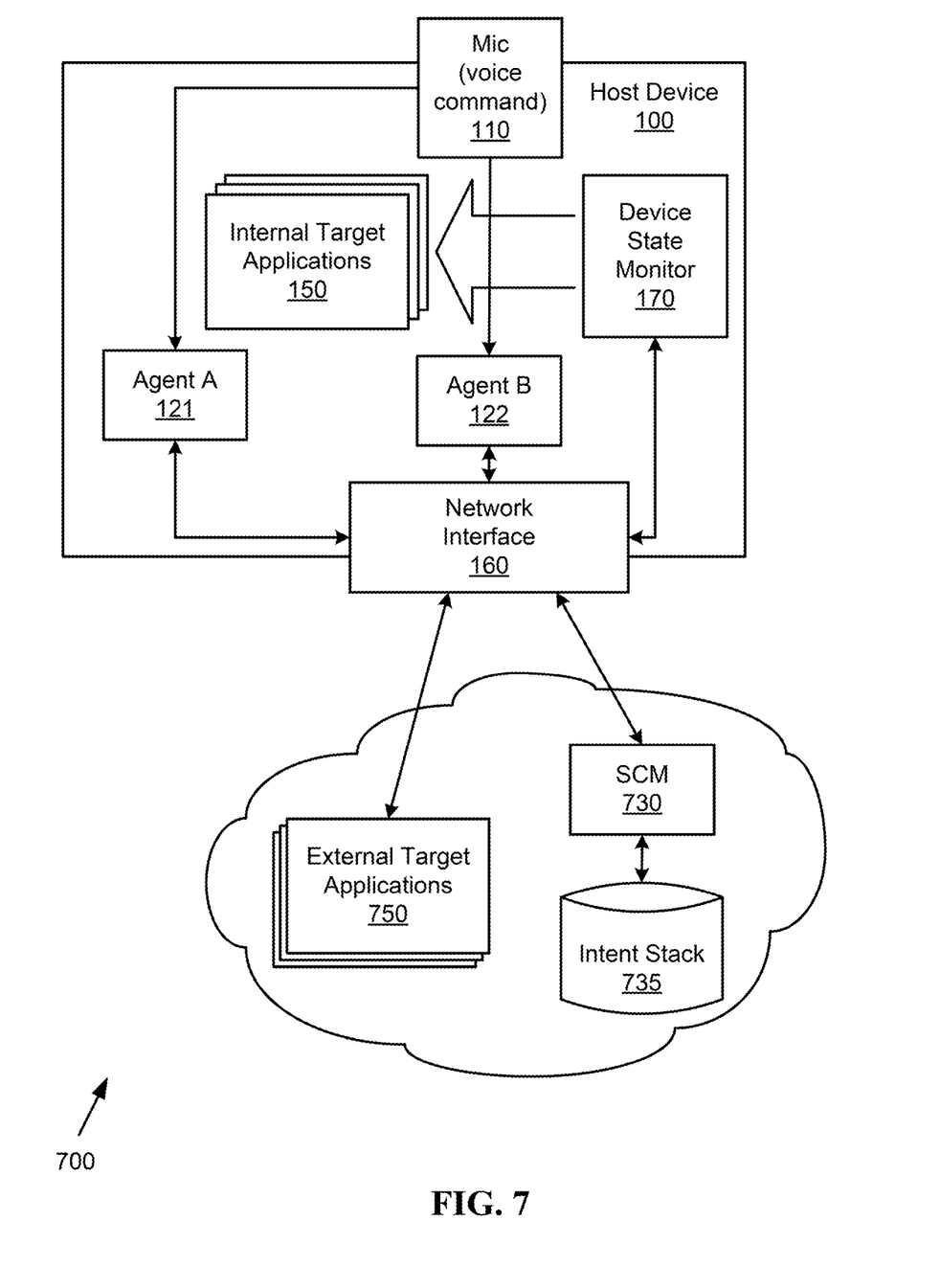
FIG. 7 is a schematic drawing of a second exemplary embodiment of a device using a shared context manager.

Other embodiments are also possible. For example, FIG. 7 shows a second embodiment 700 similar to the system of FIG. 1, where an SCM 730, an intent stack 735, and one or more target applications 750 are external to the host device 100. For example, the SCM 730, the intent stack 735, and the external target applications 750 may be cloud based, in communication with the first agent 121, the second agent 122, and/or the device state monitor via the network interface 160.

Figure 8:
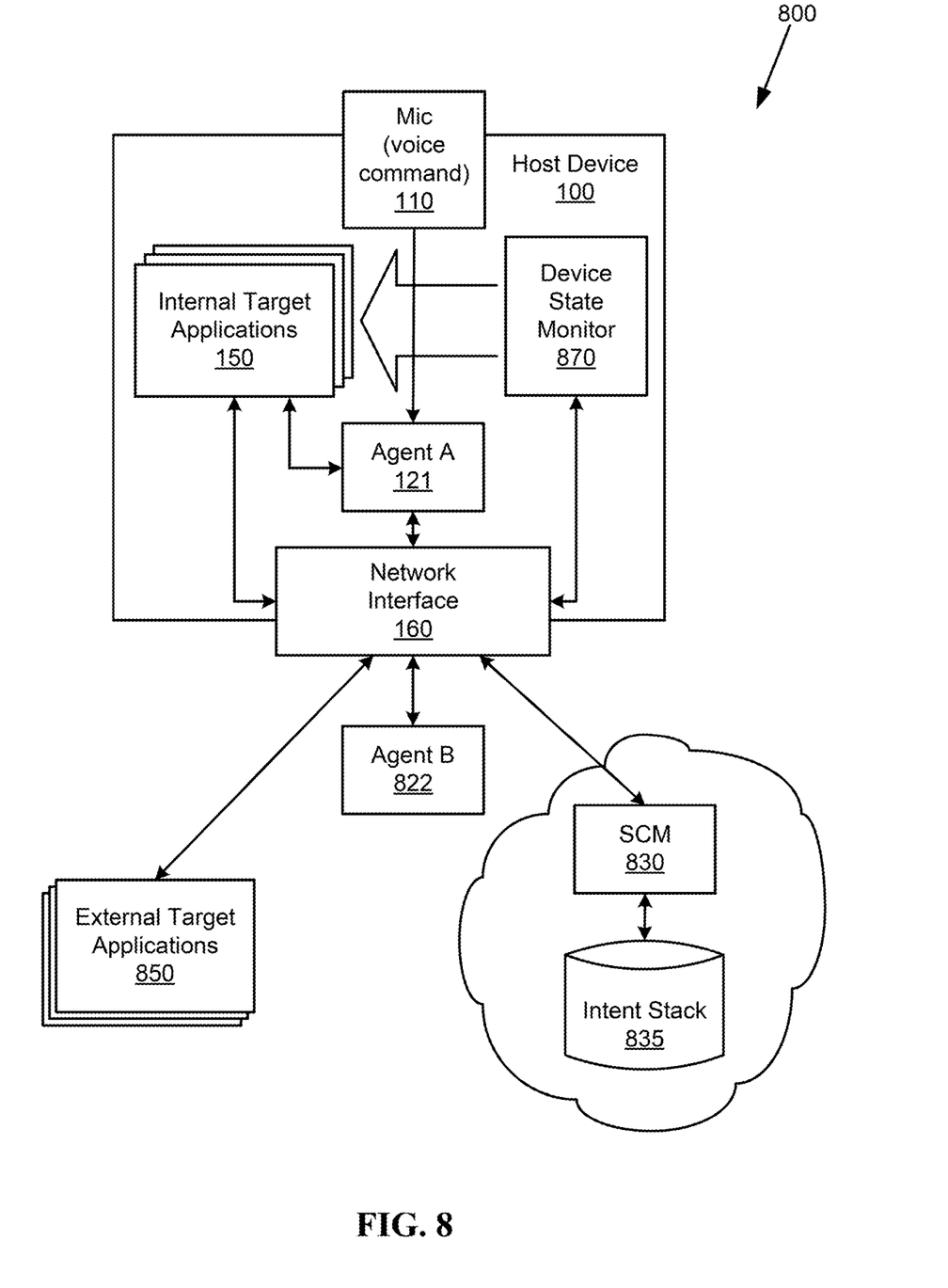
FIG. 8 is a schematic drawing of a third exemplary embodiment of a device using a shared context manager.

FIG. 8 shows a third embodiment 800 similar to the second embodiment, where an SCM 830, an intent stack 835, a second agent 822 and one or more target applications 850 are external to the host device 100. For example, the SCM 830 and the intent stack 835, may be cloud based, in communication with the first agent 121, the second agent 822, and/or the device state monitor via the network interface 160. The second agent 822 and the external target applications 850 may be external to the host device 100 and in communication with the host device 100 for example via a local area network (LAN), where the network interface 160 is also on the LAN. Similarly, the second agent may be in communication with the SCM 830 via the network interface 160 and/or the LAN. The LAN may be a wireless LAN (WLAN).

Figure 9:
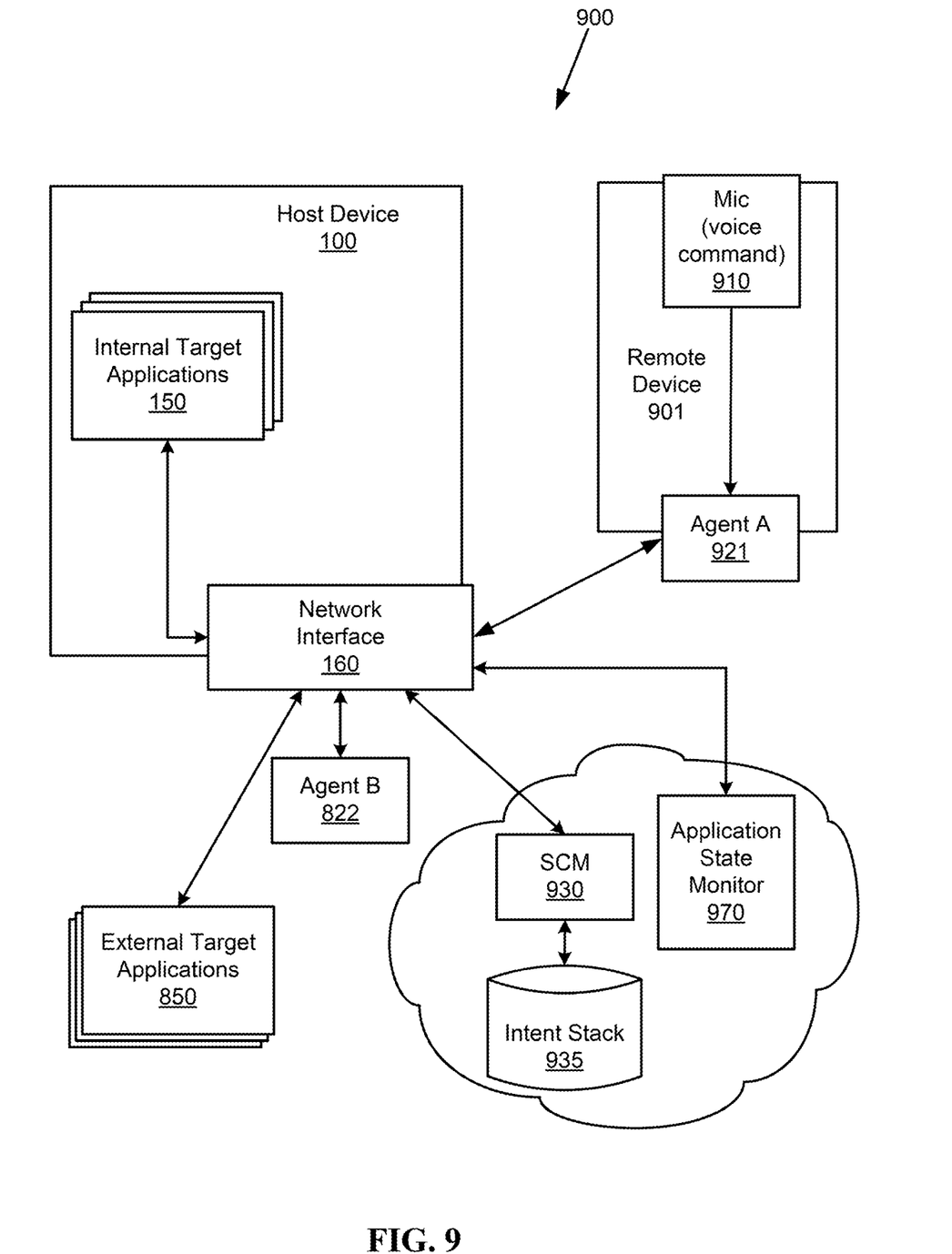
FIG. 9 is a schematic drawing of a fourth exemplary embodiment of a device using a shared context manager and a remote application state monitor.

FIG. 9 shows a fourth exemplary embodiment 900 of a device using a shared context manager 930 and a remote application state monitor 970. Under the fourth embodiment, the host device 100 hosting the target applications 150 accesses voice commands from a microphone 910 in a remote device 901 hosting the first agent 921 via the network interface 160. Under the fourth embodiment 900 an SCM 930, an intent stack 935, a second agent 822 and one or more target applications 850 are external to the host device 100. In addition, under the fourth embodiment, an application state monitor 970 monitor status of one or more of the internal target applications 150, for example, by querying the internal target applications via the network interface 160.

For example, the SCM 930, the application state monitor 970 and the intent stack 35, may be cloud based, in communication with the first agent 121, the second agent 822, and/or the device state monitor via the network interface 160. The second agent 822 and the external target applications 850 may be external to the host device 100 and in communication with the host device 100 for example via a local area network (LAN), where the network interface 160 is also on the LAN. Similarly, the second agent may be in communication with the SCM 830 via the network interface 160 and/or the LAN. The LAN may be a wireless LAN (WLAN).

The embodiments may also enable other functionalities. Returning to FIG. 1, the agents 121, 122 may each have access to information associated with an account, for example but not limited to an account associated with one or more users of a target application 150, a service accessed via a target application 150, or a device, such as the host device 100 or another device that may be controlled by a target application 150. The account information may include, for example, user preferences, user licenses to access external services (such as a media streaming service), billing information, and other information. The agents 121, 122 may share information regarding an account, for example, via direct communication between the first agent 121 and the second agent 122, and/or indirectly, for example via communication with the target application 150 or host device 100 associated with the account. In addition, or alternatively, the first agent 121 and/or the second agent 122 may be apprised of updates to account information via the SCM 130 and the intent stack 135. For example, the first agent 121 may receive a command regarding changing some account data, and the first agent may forward an intent regarding this command to the SCM 130, thereby adding the intent to the intent stack 135. Thereafter, the second agent 122 may learn of the change to the account data during an interaction with the SCM 130.

Alternative embodiments with similar variations are also possible, where the functionalities of the agents, SCM, intent stack and state monitor are distributed differently among various local and remote devices and/or servers. For example, one alternative embodiment may have a single agent, while another alternative embodiment may have three or more agents. While the above embodiments depict and describe the SCM 130, 730, 830, 930 the intent stack 135, 735, 835, 935 and the state monitor 170, 770, 870, 970 as single components, a person having ordinary skill in the art will recognize that the functionality of one or more of these elements may be combined and/or distributed across two or more physical devices, for example, the functionality may be distributed between a local portion resident in the host device 100, and a remote portion, for example, a cloud based remote portion.

It should also be noted that while the intent stack here is described a logical stack where entries are pushed onto the stack and popped from the stack, alternative embodiments may employ other types of data storage/retrieval means instead of a stack or in addition to a stack, for example, a single linked list, double linked list, or database, among others.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for controlling by a user, via a computer based first agent and a computer based second agent, a computer controlled application hosted by the system and/or in communication with the system, the system comprising:

a device for selecting at least one of the group consisting of the first agent and the second agent based on interpretation of a received command;

the first agent, wherein the first agent is configured to:
  receive a first command;
  derive a first intent from the received first command;
  identify a target application based on the first intent; and
  format an application command for the identified target application, that is specific to the identified target application, based on the first intent;

a shared context manager configured to:
  receive from the first agent the first intent derived from the first command received by the first agent, comprising a first data field based on the first command;
  receive from the second agent a second intent comprising a second data field;
  form a modified second intent based at least in part upon the first data field, which is based on the first command, wherein the modified second intent contains, at least, the second data field from the second intent and the first data field from the first intent, in which the first data field is based on the first command; and provide the modified second intent to the second agent, wherein the second agent is not privy to the first data field prior to being provided the modified second intent;

an intent stack configured to receive the first intent and the modified second intent from the shared context manager and to store the first intent and the modified second intent, wherein the shared context manager is in communication with a network interface and;

a state monitor configured to obtain and store information regarding a status of the application, wherein the second modified intent is based in part upon one of a group consisting of resolving an anaphoric content in the first field, resolving an anaphoric content in the second field, resolving an anaphoric content in the first field and the second field, and the status of the application.

2. The system of claim 1, wherein:

the shared context manager is further configured to respond to the second intent by forming a modified first intent based at least in part upon the second data field; and the intent stack updates the first intent based on the modified first intent; and the application command is based in part on the modified first intent.

3. The system of claim 2, wherein the intent stack is configured to store the modified first intent and/or the modified second intent in an ordered fashion.

4. The system of claim 2, wherein the shared context manager uses the information from the first intent and/or information from the second modified intent to query an information source to obtain the information added to the first modified intent and/or the information added to the second modified intent.

5. A method for a computer based context manager in communication with a computer based first multi-modal agent and a computer based second multi-modal agent configured to control an application, comprising the steps of:

receiving a first intent from the first multi-modal agent derived from a first command received by the first multi-modal agent, the first intent comprising a first data field based on the first command, wherein the first multi-modal agent receives the first command, derives the first intent from the received first command, identifies a target application based on the first intent and formats an application command for the identified target application, that is specific to the identified target application, based on the first intent;

receiving a second intent comprising a second data field from the second multi-modal agent;

forming a modified second intent based at least in part upon the first data field, which is based on the first command, wherein the modified second intent contains, at least, the second data field from the second intent and the first data field from the first intent, in which the first data field is based on the first command; and sending the modified second intent to the second multi-modal agent, wherein the second multi-modal agent is not privy to the first data field prior to being sent the modified second intent, wherein the second modified intent is based in part upon one of a group consisting of resolving an anaphoric content in the first field, resolving an anaphoric content in the second field, and the status of the application.

6. The method of claim 5, further comprising the steps of:

converting the first intent into a modified first intent, wherein converting the first intent into the modified first intent comprises altering a field of the first intent to augment the first intent with information not included in the first intent.

7. The method of claim 6, further comprising the step of querying an information source to obtain information used to augment the first intent and/or to form the second modified intent.

8. The method of claim 6, further comprising the steps of: storing the modified first intent in an intent stack; and storing the modified second intent in the intent stack.

9. The method of claim 8, further comprising the steps of:

receiving a third intent comprising an anaphoric content from the first multi-modal agent;

resolving the anaphoric content;

preparing a second response to the third intent based at least in part upon the resolved anaphoric content; and sending the second response to the first multi-modal agent.

10. The method of claim 9, wherein resolving the anaphoric content further comprises the step of referencing the modified first intent and/or the modified second intent in the intent stack.

11. The method of claim 9, wherein resolving the anaphoric content further comprises the step of determining a state status of the application.

12. The method of claim 9, further comprising the steps of:

converting the third intent into a modified third intent comprising the resolved anaphoric content; and storing the modified third intent in the intent stack.

13. A shared context manager in communication with a device hosting a first multi-modal agent and a second multi-modal agent configured to control an application hosted by the device and/or in communication with the device, comprising:

a processor and a non-transitory memory configured to store instructions that when executed, perform the steps of:

receiving a first intent from the first multi-modal agent derived from a first command received by the first multi-modal agent, the first intent comprising a first data field based on the first command, wherein the first multi-modal agent receives the first command, derives the first intent from the received first command, identifies a target application based on the first intent and formats an application command for the identified target application, that is specific to the identified target application and based on the first intent;

receiving a second intent comprising a second data field from the second multi-modal agent;

forming a modified second intent based at least in part upon the first data field, which is based on the first command, wherein the modified second intent contains, at least, the second data field from the second intent and the first data field from the first intent, in which the first data field is based on the first command; and sending to the second multi-modal agent a response to the second intent based at least in part upon the first data field, wherein the second multi-modal agent is not privy to the first data field prior to being sent the response to the second intent;

an intent stack configured to store the first intent and the modified second intent; and a state monitor configured to obtain and store information regarding a status of the application, wherein the second modified intent is based in part upon one of a group consisting of resolving an anaphoric content in the first field, resolving an anaphoric content in the second field, resolving an anaphoric content in the first field and the second field, and the status of the application.

14. The shared context manager of claim 13, wherein the second data field comprises an anaphoric content.

15. The shared context manager of claim 14, further comprising a state monitor configured to receive the anaphoric content and resolve the anaphoric content based upon a status of the application.

* * * * *